United States Patent
Gissel et al.

(10) Patent No.: US 7,725,901 B2
(45) Date of Patent: May 25, 2010

(54) METHOD AND SYSTEM FOR PERFORMANCE BALANCING IN A DISTRIBUTED COMPUTER SYSTEM

(75) Inventors: Thomas R Gissel, Apex, NC (US); Asser N Tantawi, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 837 days.

(21) Appl. No.: 11/106,098

(22) Filed: Apr. 14, 2005

(65) Prior Publication Data

US 2006/0236324 A1  Oct. 19, 2006

(51) Int. Cl.
G06F 9/46 (2006.01)
G06F 7/00 (2006.01)
G06F 15/16 (2006.01)

(52) U.S. Cl. .................. 718/105; 707/705; 709/229

(58) Field of Classification Search .............. 718/105, 718/102–106; 707/2; 709/219, 225, 229, 709/235

See application file for complete search history.

(56) References Cited

U.S. PATENT DOCUMENTS

| | | | |
|---|---|---|---|
| 5,504,894 A * | 4/1996 | Ferguson et al. ............... 707/2 |
| 5,603,029 A * | 2/1997 | Aman et al. ............... 718/105 |
| 5,881,238 A * | 3/1999 | Aman et al. ............... 709/226 |
| 5,881,268 A * | 3/1999 | McDonald et al. ............ 703/21 |
| 6,119,143 A | 9/2000 | Dias et al. |
| 6,178,160 B1 * | 1/2001 | Bolton et al. ............... 370/255 |
| 6,249,800 B1 | 6/2001 | Aman et al. |
| 6,446,218 B1 * | 9/2002 | D'Souza ........................ 714/4 |
| 6,496,866 B2 * | 12/2002 | Attanasio et al. ............ 709/239 |
| 6,560,717 B1 * | 5/2003 | Scott et al. ....................... 714/4 |
| 6,571,288 B1 | 5/2003 | Sarukkai |
| 6,578,066 B1 * | 6/2003 | Logan et al. ................ 718/105 |
| 6,629,148 B1 | 9/2003 | Ahmed et al. |
| 6,728,748 B1 | 4/2004 | Mangipudi et al. |
| 6,735,631 B1 * | 5/2004 | Oehrke et al. ............... 709/226 |
| 6,763,372 B1 | 7/2004 | Dani et al. |
| 6,772,211 B2 | 8/2004 | Lu et al. |
| 6,823,382 B2 * | 11/2004 | Stone ......................... 709/224 |

(Continued)

OTHER PUBLICATIONS

Theimer, M.M.; Lantz, K.A., "Finding idle machines in a workstation-based distributed system," Transactions on Software Engineering, vol. 15, No. 11, pp. 1444-1458, Nov. 1989.*

(Continued)

*Primary Examiner*—Robert Stevens
(74) *Attorney, Agent, or Firm*—Lee Law, PLLC; Christopher B. Lee

(57) ABSTRACT

A method of dynamic performance balancing in a distributed computer system including collecting average service time statistics for application requests distributed from multiple application servers and collecting application server CPU utilization statistics from multiple hosts where each host is associated with at least one of the application servers. In addition, the method includes periodically calculating scaled routing weights from the average service time and CPU utilization statistics and distributing server requests to the application servers in accordance with the scaled routing weights. Also provided is a distributed computer system configured to accomplish dynamic performance balancing as described above, and an article of manufacture for use in programming a distributed computer system containing instructions to accomplish dynamic performance balancing of server requests as described above.

7 Claims, 3 Drawing Sheets

U.S. PATENT DOCUMENTS

| | | | | |
|---|---|---|---|---|
| 7,062,768 | B2* | 6/2006 | Kubo et al. | 718/105 |
| 7,231,445 | B1* | 6/2007 | Aweya et al. | 709/226 |
| 7,254,626 | B1* | 8/2007 | Kommula et al. | 709/223 |
| 7,284,055 | B1* | 10/2007 | Oehrke et al. | 709/226 |
| 2002/0152305 | A1* | 10/2002 | Jackson et al. | 709/224 |
| 2003/0065763 | A1 | 4/2003 | Swildens et al. | |
| 2003/0126200 | A1 | 7/2003 | Wolff | |
| 2003/0172163 | A1 | 9/2003 | Fujita et al. | |
| 2003/0182423 | A1* | 9/2003 | Shafir et al. | 709/225 |
| 2003/0233403 | A1 | 12/2003 | Bae et al. | |
| 2004/0111508 | A1 | 6/2004 | Dias et al. | |
| 2004/0143662 | A1 | 7/2004 | Poyhonen et al. | |
| 2004/0181588 | A1* | 9/2004 | Wang et al. | 709/207 |
| 2005/0102398 | A1* | 5/2005 | Zhang et al. | 709/225 |
| 2005/0114429 | A1* | 5/2005 | Caccavale | 709/200 |
| 2005/0149940 | A1* | 7/2005 | Calinescu et al. | 718/104 |
| 2005/0240934 | A1* | 10/2005 | Patterson et al. | 718/105 |
| 2006/0031843 | A1* | 2/2006 | Romero | 718/104 |
| 2006/0236073 | A1* | 10/2006 | Soules et al. | 711/216 |

OTHER PUBLICATIONS

Abdelzaher, T.F.; Bhatti, N., "Web server QoS management by adaptive content delivery," Quality of Service, 1999. IWQoS '99. 1999 Seventh International Workshop on, vol., No., pp. 216-225, 1999.*

Teodoro, G.; Tavares, T.; Coutinho, B.; Meira, W., Jr.; Guedes, D., "Load balancing on stateful clustered Web servers," Computer Architecture and High Performance Computing, 2003. Proceedings. 15th Symposium on, vol., No., pp. 207-215, Nov. 10-12, 2003.*

Glazer, D.W.; Tropper, C., "On process migration and load balancing in Time Warp," Parallel and Distributed Systems, IEEE Transactions on, vol. 4, No. 3, pp. 318-327, Mar. 1993.*

H. Wang, "Load-Sensitive Adaptive Routing (LSAR) for Computer Networks", Master's thesis, UBC, 2003.*

Zhang, Xiolan, et al., "HACC: An Architecture for Cluster-Based Web Servers", Proc. of the 3rd USENIX Windows NT Symposium, Seattle, WA, Jul. 12-13, 1999, pp. 1-11.*

Andreolini, Mauro, et al., "Performance Study of Dispatching Algorithms in Multi-tier Web Architectures", ACM SIGMETRICS Performance Evaluation Review, vol. 30, Issue 2, Sep. 2002, pp. 10-20.*

Diao, Yixin, et al., "Incorporating Cost of Control into the Design of a Load Balancing Controller", RTAS '04, May 25-28, 2004, pp. 376-385.*

Pistoia, Marco, et al., "IBM WebSphere Performance Pack: Load Balancing with IBM SecureWay Network Dispatcher", IBM Redbooks, SG24-5858-00, Oct. 1999, pp. cover, i-x, 27-54 and 81-175.*

Aman, Jeffrey, et al., "Adaptive Algorithms for Managing a Distributed Data Processing Workload", IBM Systems Journal, vol. 36, No. 2, © 1997, pp. 242-283.*

Zhang, Li, et al., "A Comprehensive Toolset for Workload Characterization, Performance Modeling, and Online Control", TOOLS 2003, LNCS 2794, Springer-Verlag, Berlin, Germany, Sep. 18, 2003, pp. 63-77.*

Choi, Eunmi, "Performance Test and Analysis for an Adaptive Load Balancing Mechanism on Distributed Server Cluster Systems", Future Generation Computer Systems, vol. 20, Issue 2, Feb. 16, 2004, pp. 237-247.*

* cited by examiner

METHOD AND SYSTEM FOR PERFORMANCE BALANCING IN A DISTRIBUTED COMPUTER SYSTEM

TECHNICAL FIELD

The present invention relates generally to the field of performance balancing in a distributed computer system, and more particularly to dynamic performance balancing in a distributed system having dissimilar hosts.

BACKGROUND ART

A distributed computer system may include multiple application servers running various applications distributed across multiple physical devices. In a distributed computer system, it is desirable that the distributed servers be centrally administrated. In addition, workload management and failover are preferably handled from a central location. Thus, a distributed computer system achieves the data processing power of multiple physical computers working in concert while preserving the benefits of the centralized administration of workload management.

In a typical distributed computer system, the base functional software unit is an application server. As used throughout this specification, an "application server" is a software environment provided to run or execute applications. An "application" is a collection of modules that collectively provide answers/responses to submitted requests. Thus, an application needs an environment to run, and an application server is that environment. An application is deployed in one or more application servers.

In a distributed computer system, multiple application servers can be functionally organized in various ways. For example, a subset of the total group of application servers in the system may be organized in a cluster. A "cluster" is a collection of servers, each running an instance of the same application. Clusters may be static or dynamic.

In addition, a subset of the total group of application servers within a distributed computer system may be managed as a group which is often called a "node". Thus, a node is a managed entity where application servers run. The placement of the application servers of a given cluster onto nodes is either fixed by the user or changed dynamically, hence a static or dynamic cluster, respectively.

A "host" as used herein is a physical computing machine typically identified by an IP address. A host may house one or more nodes. Multiple nodes can be further collected into a single management domain which is often called a "cell".

A distributed computer system will thus include several physical hosts. Typically, the hosts will be somewhat heterogeneous. For example, some hosts may be older than others, and thus have different hardware and software components. Other hosts may have differing architecture and/or bus configurations. Similarly, there may be an uneven amount of work assigned to each host, either relating to the number of application servers associated with the host or in the nature and extent of unmanaged work such as garbage collection, periodic data backups, and the starting and stopping of application servers. The most efficient data processing flow within a distributed computer system will occur if work is balanced among the various heterogeneous hosts according to the capabilities of the respective host members.

Similarly, in a distributed computing system it is advantageous to balance requests belonging to the same cluster among all nodes that can service the cluster. However, the characteristics of the various clusters within the system may vary in a significant way in terms of processing requirements. Furthermore, an application server instance that serves a given cluster on a node may share the resources of the node with servers serving other clusters.

Various simple load balancing routers that attempt to equalize processor utilization among all hosts in a cell are known. Similarly, somewhat dynamic performance balancing systems which attempt to load balance based upon measured server utilization are known. However, a simple load balancing router which attempts to equalize processor utilization among all hosts in a cell may not provide for equal performance among nodes servicing requests belonging to the same cluster, nor will a simple load balancing router effectively deal with the problem of heterogeneous hosts.

The present invention is directed toward overcoming one or more of the problems discussed above.

SUMMARY OF THE INVENTION

One embodiment of the present invention is a method of dynamic performance balancing in a distributed computer system including collecting an average service time statistics for application requests distributed to multiple application servers, and collecting application server CPU utilization statistics from multiple hosts where each host is associated with at least one of the application servers. In addition, the method includes periodically calculating scaled routing weights from the average service time and CPU utilization statistics and distributing application server requests to the application servers in accordance with the scaled routing weights. The method of dynamic performance balancing may include calculating a relative performance measure for each of the multiple application servers in the system by comparing the average service time statistic for each of the multiple application servers to the average service time statistics collected for all of the multiple application servers. Similarly, an error function may be calculated for each of the multiple application servers related to the deviation of a particular relative performance measure from the performance measures collected for other application servers.

The method of dynamic performance balancing may further include applying proportional-integral-derivative (PID) control to the error function and select gain constants to calculate base routing weights. The base routing weights may further be scaled according to the CPU utilization statistics to calculate scaled routing weights. In addition, scaled routing weights may be calculated from the base routing weights by applying a select limiting factor or a select scaling factor. Alternatively, combinations of the above techniques may be used to derive scaled routing weights from the base routing weights.

Another embodiment of the present invention is a distributed computer system including multiple hosts, each host being associated with one or more nodes, and with each node being associated with one or more application servers and a monitoring agent. This embodiment also includes a performance balancer to receive an average service time statistic calculated for each application server and a CPU utilization statistic calculated for each of the hosts. Also included is a weight calculator associated with the performance balancer configured to periodically calculate scaled routing weights from the average service time statistics and CPU utilization statistics. Also included is a router configured to receive the scaled routing weights and distribute server requests to the various application servers in accordance with the scaled routing weights.

The distributed computer system may also include hardware and software components configured and programmed to calculate scaled routing weights from the base routing weights in accordance with the method described above.

Another embodiment of the present invention is an article of manufacture for use in programming a data processing system containing instructions which may cause a distributed computer system as described above to accomplish dynamic performance balancing of server requests as described above.

DETAILED DESCRIPTION OF THE PREFERRED EMBODIMENT

Figure 1:
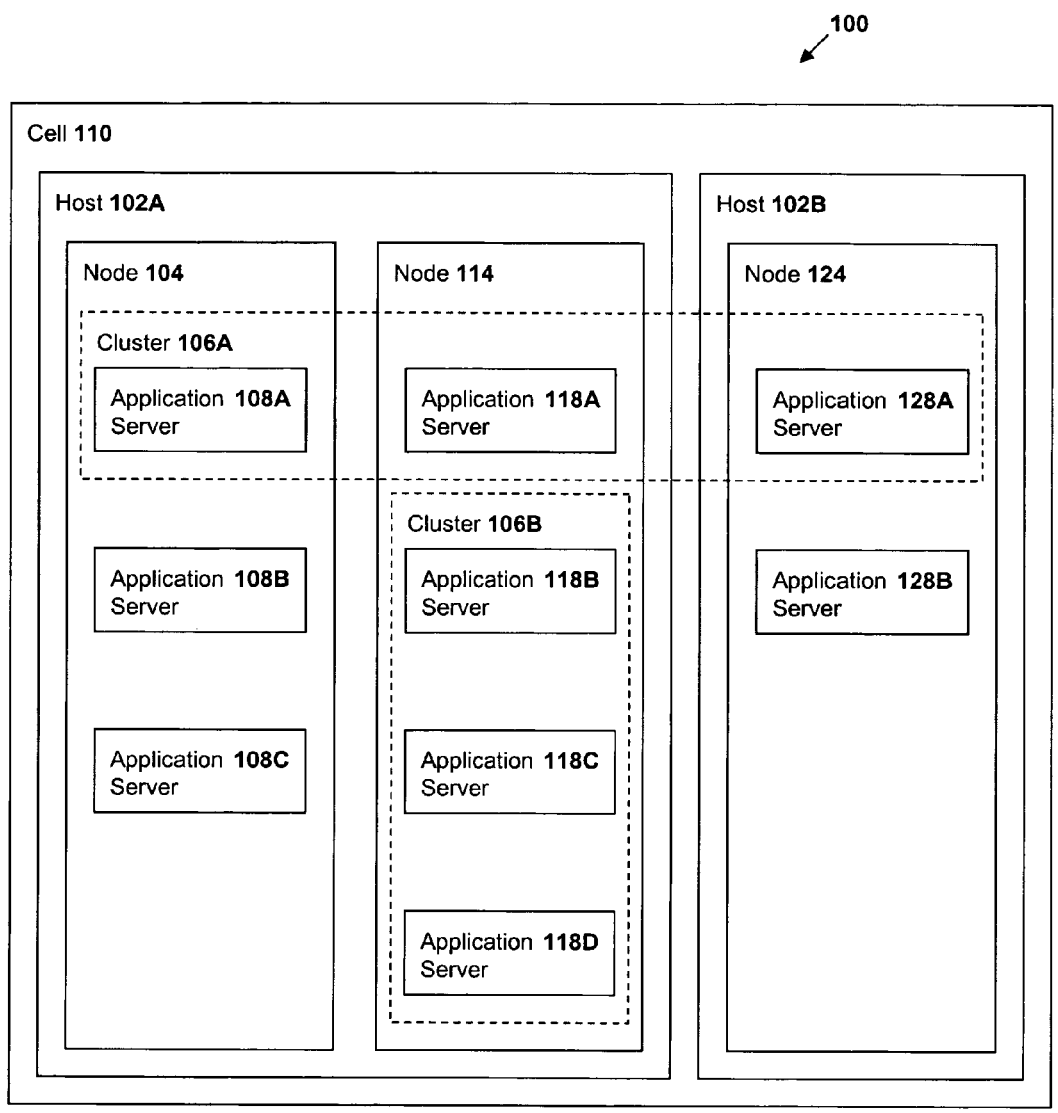
FIG. 1 is a block diagram illustrating a highly simplified distributed computer system in accordance with the present invention.

A highly simplified distributed computer system 100 is illustrated in block diagram form in FIG. 1. The distributed computer system 100 includes multiple application servers 108A-C, 118A-D, 128A-B. An application server is a software environment provided to run or execute applications.

In the distributed computer system 100, the multiple application servers 108A-C, 118A-D, 128A-B may be functionally organized in various ways. For example, a subset of the total group of application servers 108A-C, 118A-D, 128A-B may be organized in a cluster 106A, 106B. Typically, a cluster is a logical collection of application servers, each running the same instance of an application. A cluster 106A, 106B may be static or dynamic and thus able to be reconfigured as the requirements of the distributed computer system 100 change.

Application servers 108A-C, 118A-D, 128A-B may also be organized in a logical management group which is often called a node 104, 114, 124. A node 104, 114, 124 is a managed entity where application servers 108A-C, 118A-D, 128A-B run. Typically, a node 104, 114, 124 is associated with a host 102A, 102B. As used herein, a host is a physical computing machine identified by an IP address. As shown in FIG. 1, a host 102A may house multiple nodes 104, 114, or a host 102B may house a single node 124.

As discussed above, a cluster 106A, 106B includes application servers running the same instance of an application. A cluster 106A may extend horizontally across multiple nodes 104, 114, 124 or, alternatively, a cluster 106B may extend vertically and include only application servers 118B, 118C, 118D associated with a single node 114.

Multiple nodes 104, 114, 124 may be further managed in a higher grouping, often called a cell 110. The invention described herein is well suited, but not limited to, embodiments where application server requests are balanced within a cell 110.

In a typical distributed computer system 100, each of the several physical hosts 102A, 102B will have differing configurations and processing capabilities. For example, some hosts 102A, 102B may be older than others and, thus, have different hardware and software components. Other hosts 102A, 102B may have differing architecture and/or bus configurations. Similarly, there may be an uneven amount of work assigned to each host 102A, 102B, either relating to the number of application servers 108A-C, 118A-D, 128A-B associated with the nodes 104, 114, 124 housed on each host 102A, 102B or in the nature and extent of unmanaged work such as garbage collection, periodic data backups, and the starting and stopping of application servers 108A-C, 118A-D, 128A-B. The most efficient data processing flow within a distributed computer system 100 will occur if requests made by applications upon application servers 108A-C, 118A-D, 128A-B associated with various heterogeneous hosts 102A, 102B is balanced among the hosts 102A, 102B and application servers 108A-C, 118A-D, 128A-B according to the capabilities of the components of the distributed computer system 100.

Similarly, in a distributed computer system 100, it is advantageous to balance requests belonging to the same cluster 106A, 106B among all nodes 104, 114, 124 that can service the cluster 106A, 106B. For example, cluster 106A extends horizontally across nodes 104, 114, 124. Efficiency is enhanced by balancing requests directed to the application which is concurrently operating on application servers 108A, 118A, 128A among the nodes 104, 114, 124.

Figure 2:
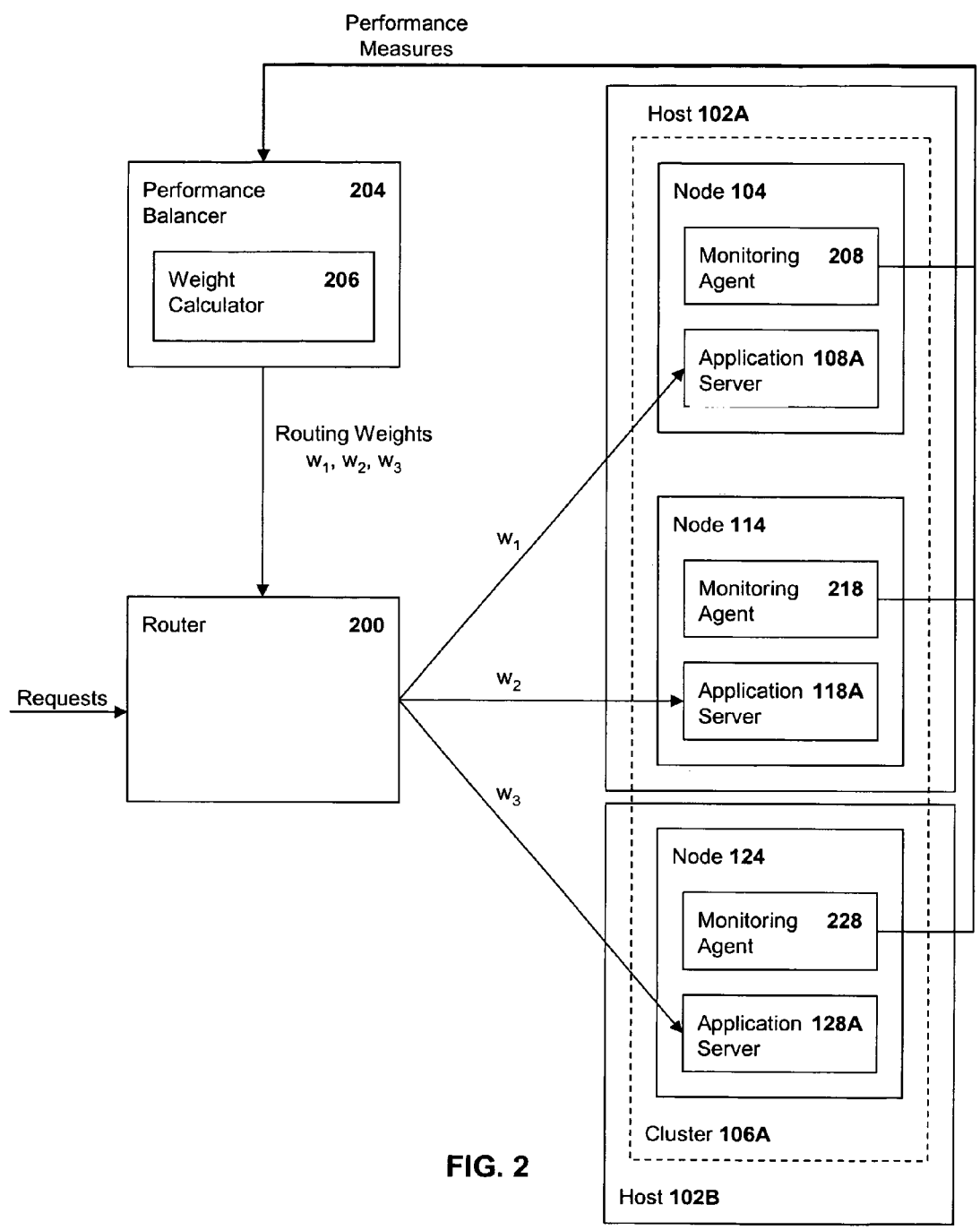
FIG. 2 is a block diagram of elements used to accomplish dynamic performance balancing in accordance with the present invention.

Dynamic performance balancing may be accomplished in a distributed computer system 100 using the elements shown in block diagram form in FIG. 2. In FIG. 2, application requests are received by a router 200 which distributes the requests to the application servers 108A, 118A, 128A. The application servers 108A, 118A, 128A of FIG. 2 each belong to the same cluster 106A. Thus, the applications servers 108A, 118A, 128A are each running instances of the same application software, and each application server 108A, 118A, 128A is capable of responding to the request. Thus, FIG. 2 shows a highly simplified portion of an entire distributed computer system 100.

Similarly, in the simplified diagram of FIG. 2, each of the application servers 108A, 118A, 128A is associated with a separate node 104, 114, 124, respectively. In addition, in the simplified distributed computer system 100 depicted in FIG. 2, nodes 104, 114 are housed on a physical host 102A, and node 124 is housed on physical host 102B. Typically, hosts 102A, 102B will have dissimilar capabilities, and thus be heterogeneous.

Also shown in FIG. 2 are monitoring agents 208, 218, 228 associated with each node 104, 114, 124, respectively. Each monitoring agent 208, 218, 228 is configured to collect average service time statistics for application requests distributed to the associated application servers 108A, 118A, 128A, respectively. For example, monitoring agent 208 would be configured to collect average service time statistics for application requests made to application server 108A, and any other application servers 108B, 108C associated with node 104 which are not shown in FIG. 2. In addition, each monitoring agent 208, 218, 228 may be configured to collect application server central processing unit (CPU) utilization statistics from the CPU of the host 102A housing the relevant application server. For example, monitoring agent 228 is configured to collect application server CPU utilization statistics from host 102B housing node 124 associated with the monitoring agent 228 and application server 128A. The CPU utilization statistics and average service time statistics collected by the monitoring agents 208, 218, 228 may collectively be defined as "performance measures".

The performance measures are communicated to a performance balancer 204 associated with the router 200. Typically, the performance balancer 204 and the router 200 will operate at the cell 110 level.

The performance balancer 204 includes a weight calculator 206 which will be configured to periodically calculate scaled routing weights. The performance balancer 204 may also convey the scaled routing weights to the router 200. Subsequently, the router 200 will distribute requests to the application servers 108A, 118A, 128A of a cluster 106A in accordance with the scaled routing weights. The periodicity of the recalculation of scaled routing weights is a configurable parameter. Thus, the method of calculating scaled routing weights from periodically collected performance measures provides for dynamic performance balancing.

Figure 3:
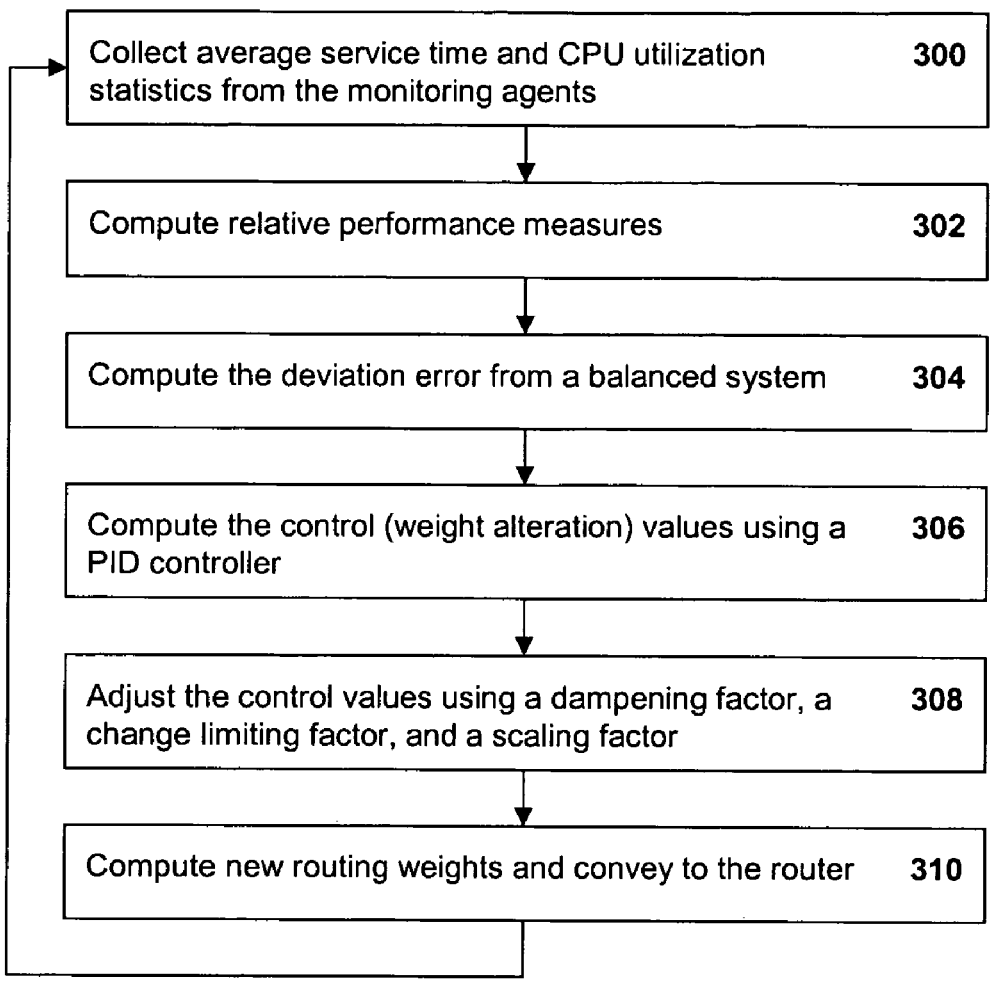
FIG. 3 is a flowchart of the steps included in the calculation and distribution of scaled routing weights in accordance with the present invention.

The steps included in the collection, calculation and distribution of scaled routing weights in one embodiment of the present invention are shown in flowchart form in FIG. 3. The weight calculator 206 may be configured to wake up periodically at the end of a control cycle. The duration of a control cycle may be made proportional to the average service time of requests with a minimum and a maximum duration limit. As shown in FIG. 3, the process of performance balancing begins with the collection of average service time and CPU utilization statistics from the monitoring agents 208, 218, 228 (step 300). As described above, each monitoring agent 208, 218, 228 collects performance statistics from its node 104, 114, 124, respectively. The performance measures collected by the various monitoring agents 208, 218, 228 are conveyed to the weight calculator 206 associated with the performance balancer 204. For purposes of the discussion below, it will be assumed that n application servers are hosted in the system for cluster 106A.

The average service time statistic collected for server i may be denoted by the function $t(i)$, where $i=1, 2 \ldots n$. Similarly, the CPU utilization statistic collected at server i may be denoted by the function $u(i)$, where $i=1, 2 \ldots n$. After the performance measures have been conveyed to the weight calculator 206, a computation of relative performance measures may occur (step 302).

In one embodiment of the present invention, the relative performance measures may be denoted by the function $y(i)$, where $i=1, 2 \ldots n$, and the function $y(i)=t(i)/\text{sum of } t(i)$ over $i=1, 2 \ldots n$. Thus, the relative performance measure may be a simple comparison of the average service time statistic for an application server to the average service time statistic for all of the n application servers. If the average service times, $t(i)$, are equal for all application servers, performance is balanced, the value of $y(i)$ would be $1/n$ for all $i=1, 2 \ldots n$.

An error function, $e(i)$, may be computed from the relative performance measures as calculated above (step 304). The error function represents the performance deviation from a balanced system. In one embodiment, the error function may be computed as $e(i)=1/n-y(i)$ for $i=1, 2 \ldots n$. If this method of calculation of the performance error is employed, the error function for application server i is positive when application server i is running relatively faster than the other application servers, resulting in lower service time, $t(i)$. Similarly, if the error function is negative, application server i is running relatively slower than the others, resulting in higher service time, $t(i)$, than the other application servers.

The value of the error function, $e(i)$, may be translated into a new base routing weight, $w(i)$, prepared from a prior routing weight, for the next weight calculation cycle. Accordingly, a positive error function will result in a positive alteration to the current routing weight, and a negative error function will result in a negative alteration to the current routing weight. The dynamic adjustments will thus lower the error measured and calculated during subsequent control cycles.

Any suitable control method may be used to derive the ultimate routing weights from the error function. An embodiment described herein utilizes proportional integral derivative (PID) control to accomplish the calculation of scaled routing weights. Other control methods are equally applicable; the invention is not limited to embodiments featuring PID control.

Scaled final routing weights may be computed using PID control methodology and select proportional integral and derivative gains (step 306). With this method, the scaled routing weights are the scaled sum of three terms:

a) a proportional gain constant times the error function, $e(i)$;

b) the integral gain times the sum of the error function, $e(i)$, over a select number of control cycles; and c) the derivative gain times the change in the error function, $e(i)$, with respect to the previous control cycle.

The resulting scaled routing weights may be communicated to the router 200 and implemented to dynamically balance server requests occurring in the next control cycle.

The scaled routing weights typically must be adjusted according to a dampening factor, a changed limiting factor, and/or a scaling factor (step 308). These factors may be applied in addition to the PID control of step 306 or separately.

The dampening factor may be selected based upon the values of the CPU utilization statistics, $u(i)$, provided by the monitoring agent 208, 218, 228. This adjustment may be applied to minimize changes in the scaled routing weights when CPU utilization is high in order to avoid performance oscillations. At high CPU utilization, a small change in the routing weight may result in a significant change in the average service time. Thus, the application of a dampening factor may be beneficial to avoid an oscillatory and unstable system.

Similarly, a limiting factor may be applied which limits the maximum change in the scaled routing weights in order to avoid abrupt load changes on the application servers. In one embodiment, the change limit may be set to $\frac{1}{2}n$. Thus, if n=4 servers, the change is limited to $\frac{1}{8}$, or 12.5%. The application of a limiting factor also serves to avoid short term instability in the dynamic balancing system.

A scaling factor which maps the newly computed scaled routing weights may also be applied. The scaling factor may be the old weight plus a select adjustment to an integer in a range that is specified by the router 200. For example, if the range of weights the router 200 works with is an integer between 0 and 20, then the newly calculated routing weight may be scaled to an integer in that range where the highest weight is 20.

After the application of one or more of a dampening factor, a change limiting factor, and/or a scaling factor (step 308) and the application of PID control to the error function (step 306), new scaled routing weights have been computed and may be conveyed from the weight calculator 206 to the router 200 (step 310), and used to balance subsequent application server requests.

It is important to note that while the present invention has been described in the context of a fully functioning data processing system, those of ordinary skill in the art will appreciated that the processes of the present invention are capable of being distributed in the form of a computer readable medium of instructions and a variety of forms and that the present invention applies regardless of the particular type of signal bearing media actually used to carry out the distribution. Examples of computer readable media include recordable-type media such as a floppy disk, a hard disk drive, a RAM, and CD-ROMs and transmission-type media such as digital and analog communication links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to a performance balancing method, the need in the art may also be met by an apparatus, a computer program product containing instructions for dynamic performance balancing in a distributed computer system, or a method for deploying computing infrastructure comprising integrating computer readable code for performance balancing a distributed computer system.

What is claimed is:

1. A method of dynamic performance balancing in a distributed computer system comprising:
    using a plurality of monitoring agents associated with a plurality of application servers, collecting an average service time statistic from each application server in a cluster of application servers, wherein each of the application servers in the cluster is a software environment running an instance of an application, and wherein the cluster is distributed across a plurality of physical hosts;
    using the plurality of monitoring agents, collecting a central processing unit utilization statistic from each of the plurality of physical hosts;
    using the plurality of monitoring agents, communicating a plurality of average service time statistics and a plurality of central processing unit utilization statistics to a performance balancer associated with a router configured to receive a plurality of scaled routing weights;
    using the performance balancer, periodically calculating a plurality of routing weights from the plurality of average service time statistics and the plurality of central processing unit utilization statistics;
    responsive to calculating the plurality of routing weights, calculating the plurality of scaled routing weights, each scaled routing weight being a sum of a proportional gain constant multiplied by an error function, an integral gain multiplied by a sum of the error function over a pre-determined number of control cycles, and a derivative gain multiplied by a change in the error function with respect to a previous control cycle; and
    using the router, distributing requests for the application to the application servers in the cluster in accordance with the plurality of scaled routing weights.

2. The method of dynamic performance balancing of claim 1, further comprising calculating a relative performance measure for each of the application servers in the cluster by comparing the average service time statistic for each of the application servers in the cluster to the average service time statistics collected for all of the application servers in the cluster.

3. The method of dynamic performance balancing of claim 2, further comprising calculating the error function for each of the application servers in the cluster by determining the deviation of the relative performance measure for each of the application servers in the cluster from the relative performance measure for each of the application servers in the cluster in a balanced system, wherein in the balanced system the relative performance measures collected for all of the plurality of application servers are equal.

4. The method of dynamic performance balancing of claim 3, further comprising applying proportional integral derivative control to the error function of each application server in the cluster to calculate the plurality of scaled routing weights.

5. The method of dynamic performance balancing of claim 1, further comprising adjusting the plurality of scaled routing weights with a dampening factor selected based on the central processing unit utilization statistics.

6. The method of dynamic performance balancing of claim 1, further comprising adjusting the plurality of scaled routing weights with a limiting factor, wherein the limiting factor limits change in each of the plurality of scaled routing weights to avoid abrupt load changes on the cluster.

7. A method of dynamic performance balancing in a distributed computer system comprising:
    using a plurality of monitoring agents associated with a plurality of application servers, collecting an average service time statistic from each application server in a cluster of application servers, wherein each of the application servers in the cluster is a software environment running an instance of an application, and wherein the cluster is distributed across a plurality of physical hosts;
    using the plurality of monitoring agents, collecting a central processing unit utilization statistic from each of the plurality of physical hosts;
    using the plurality of monitoring agents, communicating a plurality of average service time statistics and a plurality of central processing unit utilization statistics to a performance balancer associated with a router configured to receive a plurality of scaled routing weights;
    using the performance balancer, calculating a relative performance measure for each of the application servers in the cluster by comparing the average service time statistic for each of the application servers in the cluster to the average service time statistics collected for all of the application servers in the cluster;
    using the performance balancer, calculating a balanced system relative performance measure, wherein the relative performance measures calculated for each of the application servers in the cluster are equal, and thereby indicate a balanced system condition;
    using the performance balancer, calculating an error function for each of the application servers in the cluster by determining a deviation of the relative performance measure for each application server in the cluster from the balanced system relative performance measure;
    using the performance balancer, calculating a plurality of routing weights comprising a routing weight for each application server in the cluster by applying proportional integral derivative control to the error function for each of the application servers in the cluster;
    responsive to calculating the plurality of routing weights, calculating the plurality of scaled routing weights, each scaled routing weight being a sum of a proportional gain constant multiplied by the error function for the associated server in the cluster, an integral gain multiplied by a sum of the error function for the associated server in the cluster over a pre-determined number of control cycles, and a derivative gain multiplied by a change in the error function for the associated server in the cluster with respect to a previous control cycle;
    using the performance balancer, adjusting the plurality of scaled routing weights with a dampening factor selected based on the central processing unit utilization statistics of the physical hosts;

using the performance balancer, adjusting the plurality of scaled routing weights with a limiting factor, wherein the limiting factor limits change in each of the plurality of scaled routing weights above a threshold amount to avoid abrupt load changes on the cluster; and using the router, distributing requests for the application to the application servers in the cluster in accordance with the plurality of scaled routing weights.

* * * * *